US009539681B2

(12) United States Patent
Santner et al.

(10) Patent No.: US 9,539,681 B2
(45) Date of Patent: Jan. 10, 2017

(54) LASER ASSISTED MACHINING SYSTEM FOR CERAMICS AND HARD MATERIALS

(75) Inventors: Joseph S. Santner, Munster, IN (US); Federico M. Sciammarella, DeKalb, IL (US); Stefan Kyselica, Glen Ellyn, IL (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 342 days.

(21) Appl. No.: 13/307,532

(22) Filed: Nov. 30, 2011

(65) Prior Publication Data

US 2013/0134141 A1     May 30, 2013

(51) Int. Cl.
*B23K 26/38* (2014.01)
*B23P 25/00* (2006.01)
*B23K 26/00* (2014.01)
*G05B 19/18* (2006.01)

(52) U.S. Cl.
CPC .......... *B23P 25/006* (2013.01); *B23K 26/0093* (2013.01); *G05B 19/182* (2013.01); *G05B 2219/45165* (2013.01)

(58) Field of Classification Search
USPC ......... 219/121.68, 121.69, 121.83, 121.67, 219/121.78, 121.79, 121.8, 121.6, 121.85; 72/342.1, 342.94
See application file for complete search history.

(56) References Cited

U.S. PATENT DOCUMENTS

| | | | |
|---|---|---|---|
| 2,600,453 A | 6/1952 | Weingart | |
| 2,654,821 A | 10/1953 | Gillett | |
| 3,587,367 A | 6/1971 | Dotson | |
| 4,229,640 A | 10/1980 | Castellani Longo | |
| 4,352,973 A | 10/1982 | Chase | |
| 4,356,376 A | 10/1982 | Komanduri et al. | |
| 4,378,989 A * | 4/1983 | La Fiandra et al. | ............ 65/271 |
| 4,403,134 A * | 9/1983 | Klingel | ................ B23K 26/146 |
| | | | 219/121.67 |
| 4,459,458 A | 7/1984 | Vetsch et al. | |
| 4,689,467 A * | 8/1987 | Inoue | ..................... B23K 10/00 |
| | | | 219/121.6 |

(Continued)

OTHER PUBLICATIONS

Dr. F.M. Sciammarella et al.; Investigation of Absorptivity for Fiber Laser Assisted Machining of Silicon Nitride; Materials Science & Technology 2008; Oct. 5-9, 2008, Pittsburgh, PA; 27 pages.

(Continued)

*Primary Examiner* — David Angwin
*Assistant Examiner* — Amit K Singh
(74) *Attorney, Agent, or Firm* — Reinhart Boerner Van Deuren P.C.

(57) ABSTRACT

An improved apparatus and method for laser assisted machining are provided, by utilizing a computer to develop interrelated heating and machining plans, from a variety of input data describing the material to be machined, the properties of lasers and pyrometers used for heating the material, and computer models of the machining arrangement, workpiece and final part to be produced. An iterative process continues until the machining and heating plans result in the cutting zone of the workpiece being maintained at a desired temperature with no obstruction in the line-of-sight of at least one laser and pyrometer throughout the machining process, while also maintaining the cutting tool at or below a desired maximum temperature.

15 Claims, 6 Drawing Sheets

(56) References Cited

U.S. PATENT DOCUMENTS

| | | | |
|---|---|---|---|
| 4,733,049 A | | 3/1988 | Lemelson |
| 4,749,840 A | | 6/1988 | Piwczyk |
| 4,857,697 A | | 8/1989 | Melville |
| 4,925,523 A | | 5/1990 | Braren et al. |
| 5,256,851 A | | 10/1993 | Presby |
| 5,614,115 A | * | 3/1997 | Horton .............. B23K 26/0846 219/121.67 |
| 5,698,121 A | | 12/1997 | Kosaka et al. |
| 5,837,960 A | * | 11/1998 | Lewis et al. ............. 219/121.63 |
| 5,849,371 A | | 12/1998 | Beesley |
| 5,859,405 A | * | 1/1999 | Golz et al. .............. 219/121.67 |
| 5,906,459 A | | 5/1999 | Thomas et al. |
| 6,012,903 A | * | 1/2000 | Boelkins ........................ 417/63 |
| 6,122,564 A | | 9/2000 | Koch et al. |
| 6,218,642 B1 | | 4/2001 | Christmas et al. |
| 6,391,251 B1 | | 5/2002 | Keicher et al. |
| 6,393,687 B1 | | 5/2002 | Friedrich |
| 6,410,105 B1 | | 6/2002 | Mazumder et al. |
| 6,653,210 B2 | | 11/2003 | Choo et al. |
| 6,666,630 B2 | | 12/2003 | Zimmermann et al. |
| 6,811,744 B2 | | 11/2004 | Keicher et al. |
| 6,859,681 B1 | | 2/2005 | Alexander |
| 7,002,100 B2 | | 2/2006 | Wu et al. |
| 7,257,879 B1 | | 8/2007 | Jancsó |
| 8,053,705 B2 | | 11/2011 | Shin |
| 2003/0066822 A1 | | 4/2003 | Kusnezow |
| 2004/0173590 A1 | | 9/2004 | Hata et al. |
| 2004/0206734 A1 | | 10/2004 | Horsting |
| 2005/0006361 A1 | | 1/2005 | Kobayashi et al. |
| 2005/0029330 A1 | | 2/2005 | Kohn |
| 2006/0006157 A1 | * | 1/2006 | Oldani ................... B23K 26/10 219/121.64 |
| 2007/0062920 A1 | | 3/2007 | Shin |

OTHER PUBLICATIONS

Federico Sciammarella et al.; Production Environment Laser Assisted Machining (LAM) of Silicon Nitride; 34th International Conference and Exposition on Advanced Ceramics and Composites; Jan. 24-29, 2010, Daytona Beach, FL; 21 pages.
Dr. F. Sciammarella Ph.D. et al.; Fiber Laser Assisted Machining of Silicon Nitride; 28th International Congress on Applications of Lasers & Electro-optics; Nov. 2-5, 2009, Orlando, FL; 17 pages.
Sriharsha Panuganti; Understanding Fiber-Coupled Diode Laser Superheating in Laser-assisted Machining of Silicon Nitride ($Si_3N_4$); thesis; Aug. 2009; 101 pages.
Anoop N. Samant et al.; The Laser Surface Modification of Advanced Ceramics: A Modeling Approach; JOM; Aug. 2007; 4 pages.
Lockheed Martin F-35 Leads to New Titanium Machining Process; 1 page printed from internet Nov. 23, 2010; http://www.lockheedmartin.com/cgi-bin/pfv.pl.
Clarification to Approach[1] to High Speed Machining of Ceramics; paper; Mar. 14, 2008; 3 pages.
Jay C. Rozzi, Ph.D.; An Indirect Cooling System for Cost-Effective, Environmentally Friendly Machining; known prior to Nov. 30, 2011; 1 page.
Tool Life Significantly Extended with ICEFLY™ System; brochure; 2002; 3 pages; Air Products and Chemical, Inc.
LAMP; Laser Aided Manufacturing Processes Lab, University of Missouri—Rolla; known prior to Nov. 30, 2011; 1 page printed from internet http://web.mst.edu/-lamp/.
Laser Aided Material Deposition Process; Laser Aided Manufacturing Processes Lab, University of Missouri—Rolla; known prior to Nov. 30, 2011; 2 pages printed from internet http://web.mst.edu/-lamp/laserprocess.shtml.
Kathy Kincade; Micromechanical Digital-to-analog Converter Makes Micromirror Arrays More Practical; Laser Focus World; May 2005; vol. 41, Issue 5; 5 pages printed from internet http://www.laserfocusworld.com/articles/printe/volume-41/issue-5/world-news/micromechanical-digital-to-analog-converter-makes-micromirror-arrays-more-practical.html.
Shuting Lei et al.; Deformation Mechanisms and Constitutive Modeling for Silicon Nitride Undergoing Laser-Assisted Machining; International Journal of Machine Tools & Manufacture Design, Research and Application; Dec. 2000; 23 pages; vol. 40, No. 15; Elsevier Science Ltd., Oxford, U.K.
S. Lei et al.; Experimental Investigation of Thermo-Mechanical Characteristics in Laser-Assisted Machining of Silicon Nitride Ceramics; Journal of Manufacturing Science and Engineering; Nov. 2001; 10 pages; vol. 123, No. 4; The American Society of Mechanical Engineers.
Y.C. Shin et al.; Laser-Assisted Machining: Its Potential and Future; Machining Technology; Third Quarter 2000; 7 pages; The Machining Technology Association of the Society of Manufacturing Engineers.
Patrick A. Rebro et al.; Design of Operating Conditions for Crackfree Laser-Assisted Machining of Mullite; International Journal of Machine Tools & Manufacture Design, Research and Application; Jun. 2004; 20 pages; vol. 44, No. 7-8; Elsevier Science Ltd., Oxford, U.K.
Patrick A. Rebro et al.; Laser-Assisted Machining of Reaction Sintered Mullite Ceramics; Journal of Manufacturing Science and Engineering; Nov. 2002; 13 pages; vol. 124, No. 4; The American Society of Mechanical Engineers.
Patrick A. Rebro et al.; Comparative Assessment of Laser-Assisted Machining for Various Ceramics; Transactions of the North American Manufacturing Research Institution of SME; May 21-24, 2002; 10 pages; vol. XXX; Society of Manufacturing Engineers in cooperation with the North American Manufacturing Research Institution of SME.
Jay C. Rozzi et al.; Experimental Evaluation of the Laser Assisted Machining of Silicon Nitride Ceramics; Journal of Manufacturing Science and Engineering; Nov. 2000; 7 pages; vol. 122, No. 4; The American Society of Mechanical Engineers.
Jay C. Rozzi et al.; Transient, Three-dimensional Heat Transfer Model for the Laser Assisted Machining of Silicon Nitride: I. Comparison of Predictions with Measured Surface Temperature Histories; International Journal of Heat and Mass Transfer; 2000; 15 pages.
Frank E. Pfefferkorn et al.; Laser-Assisted Machining of Magnesia-Partially-Stabilized Zirconia; Journal of Manufacturing Science and Engineering; Feb. 2004; 12 pages; vol. 126, No. 1; ASME.
C. Zhang et al.; A Novel Laser-Assisted Truing and Dressing Technique for Vitrified CBN Wheels; International Journal of Machine Tools & Manufacture Design, Research and Application; May 2002; 13 pages; vol. 42, No. 7; Elsevier Science Ltd., Oxford, U.K.

* cited by examiner

LASER ASSISTED MACHINING SYSTEM FOR CERAMICS AND HARD MATERIALS

FIELD OF THE INVENTION

The present invention relates generally to laser assisted machining, and more particularly to apparatuses and methods which utilize multiple laser units to assist in machining a workpiece.

BACKGROUND OF THE INVENTION

Certain materials such as ceramics, glass, nickel superalloy, etc., are difficult to machine. The efficiency and effectiveness of machining operations involving such materials can be significantly improved by heating a cutting zone of the workpiece to a relatively high temperature, near the softening temperature of the material, to thereby reduce the flow stress in the material, prior to machining the finished part from the workpiece.

In order to effectively and efficiently machine the workpiece, without causing damage to a cutting tool through overheating of the cutting tool, one particular type of laser assisted machining (LAM) utilizes one or more lasers focused on a small area of the workpiece immediately ahead of the cutting tool in the cutting path of the cutting tool. Such LAM processes, utilizing one or more lasers, are illustrated in U.S. Pat. No. 4,229,640 to Longo; U.S. Pat. No. 4,925,523 to Braren et al.; U.S. Pat. No. 6,393,687 to Friedrich; U.S. Pat. No. 7,002,100 to Wu et al.; and, U.S. Pat. No. 7,257,879 to Jancsó. Such a prior approach to laser assisted machining approach is also disclosed in published U.S. Patent Application No. 2007/0062920 A1 to Shin.

Prior approaches to LAM have only been capable of efficiently and effectively producing very simple parts from workpieces having a simple shape, however, using very rudimentary machining techniques such as turning or single axis milling. The use of lasers in a conventional machining process, together with the necessity for monitoring the amount of heat and the temperature being beamed on to the workpiece during machining operations has led to unique challenges in utilizing laser assisted machinery in a broader fashion.

It is desirable to provide the advantages of laser assisted machining in more complicated machining operations, and for workpieces and final parts having more complexity than have been producible by prior approaches to LAM.

BRIEF SUMMARY OF THE INVENTION

The invention provides an improved apparatus and method for laser assisted machining (LAM) by utilizing a computer to develop interrelated heating and machining plans, from a variety of input data describing the material to be machined, the properties of lasers and pyrometers used for controlling the temperature of the material in a cutting zone, computer models of the machining arrangement, workpiece and final part to be produced. An iterative process continues until the machining and heating plans result in the cutting zone of the workpiece being maintained at a desired temperature with no obstruction in the line-of-sight of at least one laser and pyrometer throughout the machining process, while maintaining the cutting tool at or below a desired maximum temperature.

As used herein, the terms "heating plan" and "machining plan" include instructions for moving one or all of the workpiece, a machining arrangement in which the workpiece is mounted, cutting tools, and lasers and temperature sensing pyrometers used in the LAM process, in addition to more traditional processing parameters, such as cutting tool selection, operating speed and feed rates, material properties, cutting paths and coolant application.

According to the invention, a method and apparatus for laser assisted machining (LAM) of a finished part from a workpiece mounted in a machining arrangement using a cutter of the machining arrangement are provided, for removing material from the workpiece along a cutting path including a cutting zone of the workpiece ahead of the cutter. The cutting zone is heated to a desired machining temperature by a laser heating arrangement having one or more lasers operatively disposed for heated the cutting zone and at least one pyrometer arrangement for detecting a temperature of the cutting zone.

Dynamic computer models in machine readable format for the workpiece, the finished part, the machining arrangement, and a laser heating arrangement are inputted to a controller, according to the invention. The dynamic computer models are all related to a common reference system and describe the physical shape and all potential movement and orientation of the models with respect to the common reference system.

Material property data is also inputted in machine readable format into the computer for the workpiece and machining arrangement. The property data includes thermal and optical material properties of the workpiece and desired machining temperature data.

Operating parameters for the laser and pyrometer are also provided as inputs to the controller, for the laser heating arrangement, in machine readable format. The laser operating parameters include input and output power, line-of-sight coordinates and beam configuration parameters for each laser of the one or more lasers, and pyrometer operating parameters including input and output operating parameters of the pyrometer arrangement.

The computer is used to generate the cutting path and to define a recommended machining plan which includes the feed, speed, and depth of cut for accomplishing the desired machining operation with the cutting zone at a desired machining temperature. The recommended machining plan includes movement and orientation of the models of the workpiece, the finished part and the manufacturing arrangement during manufacturing of the finished part from the workpiece.

A recommended heating plan for the laser heating arrangement is generated by the computer from the recommended machining plan. The recommended heating plan uses one or more lasers to heat cutting zone during machining and monitors the temperature in the cutting zone with the pyrometer arrangement. The recommended heating plan includes movement and orientation of the model of the laser heating arrangement during machining of the finished part from the workpiece.

Prior to initiating actual machining of the workpiece, the controller verifies that the cutting zone of the workpiece will be maintained at a desired machining temperature during the machining operation according to the recommended machining and heating plans.

Prior to initiating actual machining of the workpiece, the controller also verifies that the one or more lasers and the one or more pyrometers utilized in the recommended heating plan will have an unobstructed line-of-sight from their location to the cutting zone, throughout the recommended machining process. The machining and heating plans are then iterated by the computer until the recommended machining and heating plans result in the cutting zone being maintained at the desired temperature with no obstruction of the line-of-sight throughout the machining process.

After the controller verifies that the cutting zone is maintained at the desired temperature and the line-of-sight is not obstructed throughout the machining process using the recommended machining and heating plans, the apparatus and/or method according to the invention is then used for machining the workpiece in accordance with the recommended machining and heating plans.

The invention may also include, iterating at least one of the recommended machining and heating plans to achieve at least one desired aspect of the method from the group of desired aspects consisting of: number of lasers used for heating; to achieve at least one desired aspect of the method from the group of desired aspects consisting of: number of lasers used for heating; number of pyrometers used for measurement of temperature of the cutting zone; degrees of freedom of movement and orientation afforded the machining arrangement; degrees of freedom of movement and orientation afforded one or more of the one or more lasers; degrees of freedom of movement and orientation of one or more of the one or more pyrometer arrangements; a desired surface finish of the finished part; a desired tolerance range for a dimension of the finished part; a desired temperature range for the cutting zone; a desired shape of the cutting zone; a desired depth of heating for the cutting zone; a desired power input to the heating arrangement; a desired power output or set-point temperature of the heating arrangement; cutting feeds and speed, cutter shape; cutter movement.

In some forms of the invention, at least one of the recommended heating and machining plans may include the step of making an adjustment to at least one of the machining and heating plans during the machining process. The adjustment to at least one of the machining and heating plans during the machining process may be made by the controller "on-the-fly" as the machining process continues uninterrupted.

In some embodiments of the invention, at least one of the recommended machining and heating plans may include stopping the machining process at least once so that the controller can make the adjustment to at least one of the machining and heating plans while the machining process is stopped, and then resuming the machining process according to the recommended plans.

In various forms of the invention, an adjustment to at least one of the machining and heating plans may include making one or more adjustments from the group of adjustments consisting of: changing the cutter; changing the number of lasers; and repositioning the workpiece.

The invention may also take the form of an apparatus for performing a method according to the invention.

According to the invention, the laser heating arrangement may include at least one laser mounted on a robotic arrangement that is operatively connected to, but moveable independently from the machining arrangement and the workpiece. The laser and robotic arrangement may be operable by the controller in accordance with the recommended machining and heating plans.

In some forms of the invention, a laser heating arrangement may also include at least one pyrometer arrangement mounted on a robotic arrangement that is operatively connected to, but moveable independently from the machining arrangement and the workpiece. The pyrometer and robotic arrangements may be operable by the controller in accordance with the recommended heating plan.

The laser heating arrangement in some forms of the invention may include multiple lasers and multiple pyrometers. One of the multiple pyrometers may be utilized as a master pyrometer for control purposes in monitoring and maintaining the desired temperature in the cutting zone. In some forms of the invention having multiple pyrometers and lasers, a slave pyrometer not currently serving as the master pyrometer, may be assigned to monitor the contribution to temperature in the cutting zone being imparted by a particular one of the multiple lasers, to thereby provide more precise monitoring and control of that laser. In some forms of the invention, such slave pyrometers provide feedback indicating a loss of output of that laser as it ages, or other valuable information such as an indication that a lens of the laser may be dirty or occluded. An apparatus and/or method according to the invention may be configured to make compensating adjustments to the laser having its performance monitored by the slave pyrometer.

Some forms of an apparatus according to the invention may include a base adapted for attachment to the machining arrangement, a radial arm, a mounting post, and a primary mounting rail adapted for attachment thereto of one or more components of the laser heating arrangement. The base may define a central axis extending perpendicularly to the base. The radial arm may extend radially outward from the base and define a radial axis extending perpendicularly to and intersecting the central axis of the base. The mounting post may have a proximal end thereof attached to the radial arm and extend generally parallel to the central axis of the base. The mounting post may also define a mounting post axis extending generally from the proximal end to a distal end of the mounting post in a direction parallel to the central axis of the base. The primary mounting rail may have a proximal end thereof attached to the mounting post and extend generally perpendicularly to the mounting post axis. The primary mounting rail may also define a primary mounting rail axis extending generally from the proximal end to a distal end of the primary mounting post in a direction perpendicular to the mounting post axis. The primary mounting rail may be adapted for attached thereto of one or more components of the laser heating arrangement from a group of laser heating arrangement components consisting of: at least one laser and at least one pyrometer arrangement.

The base, radial arm, mounting post and primary mounting rail may be configured as components of the apparatus for LAM that are cooperatively configured and operatively connected such that they are moveable relative to one another in at least one of a group of relative movements consisting of:

the radial arm is movable angularly with respect to the base about the central axis of the base;

the mounting post is movable with respect to the radial arm along the radial axis of the radial arm;

the primary mounting rail is movable with respect to the mounting post along the mounting post axis;

the primary mounting rail is movable angularly with respect to the mounting post about the mounting post axis; and at least a portion of the primary mounting rail is rotatable about the primary mounting rail axis.

One or more of the base, radial arm, mounting post and primary mounting rail, in an apparatus according to the invention, may include marked indicia to facilitate positioning of the moveable components of the apparatus for LAM. The primary mounting rail may include marked indicia thereupon to facilitate to positioning of one or more components of the laser heating arrangement.

An apparatus for LAM, according to the invention, may include a laser heating arrangement (LHA) component mount adapted for operatively mounting the one or more components of the laser heating arrangement on the primary mounting rail. The primary mounting rail may include marked indicia thereupon to facilitate positioning of the LHA component mount along the primary mounting rail. In some forms of the invention, an LHA component mount is configured to provide angular adjustment of an angular position of the LHA component with respect to the primary mounting rail. Such an LHA component mount may include angular indicia thereupon to facilitate angular adjustment of the angular position of the LHA component with respect to the primary mounting rail.

Some forms of an apparatus for LAM, according to the invention, may include a first and a second LHA component, and a second LHA component mount for mounting a second LHA component on the first LHA component. In some forms of the invention, the second LHA component mount may be configured to provide angular adjustment of an angular position of the second LHA component with respect to the first LHA component. The second LHA component mount may include angular indicia thereupon to facilitate to angular adjustment of the angular position of the second LHA component with respect to the first LHA component. A first LHA component mount, in some forms of the invention, may be adapted for operatively mounting the first LHA component on the primary mounting rail, with the first LHA component mount being configured to provide angular adjustment of an angular position of the first LHA component with respect to the primary mounting rail. Such a first LHA component mount may be include angular indicia thereupon to facilitate angular adjustment of the angular position of the first LHA component with respect to the primary mounting rail.

In forms of the invention where the machining arrangement includes a turret having a moveable central chuck and an outer element disposed about and operatively connected to the central chuck to allow movement of the central chuck with respect to the outer element, the base of an apparatus for LAM, according to the invention, may be adapted for attachment to the outer element of the turret. Those having skill in the art will recognize that such an arrangement may be particularly beneficial in machining arrangements having multiple turrets, such as a Mazak machining center. Where the outer element of the turret to which the base is attached is generally circular shaped, the base may include a generally circular opening therein centered about the central axis of the base. The base may be further configured for operative attachment to the outer element of the turret in such a manner that the central axis of the base is aligned substantially coaxial with the central chuck of the turret.

The invention may also take the form of a controller-readable medium having computer executable instructions for performing the steps of a method for laser assisted machining of a finished part from a workpiece in a machining arrangement using a machining process in accordance with the invention.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention is described herein in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
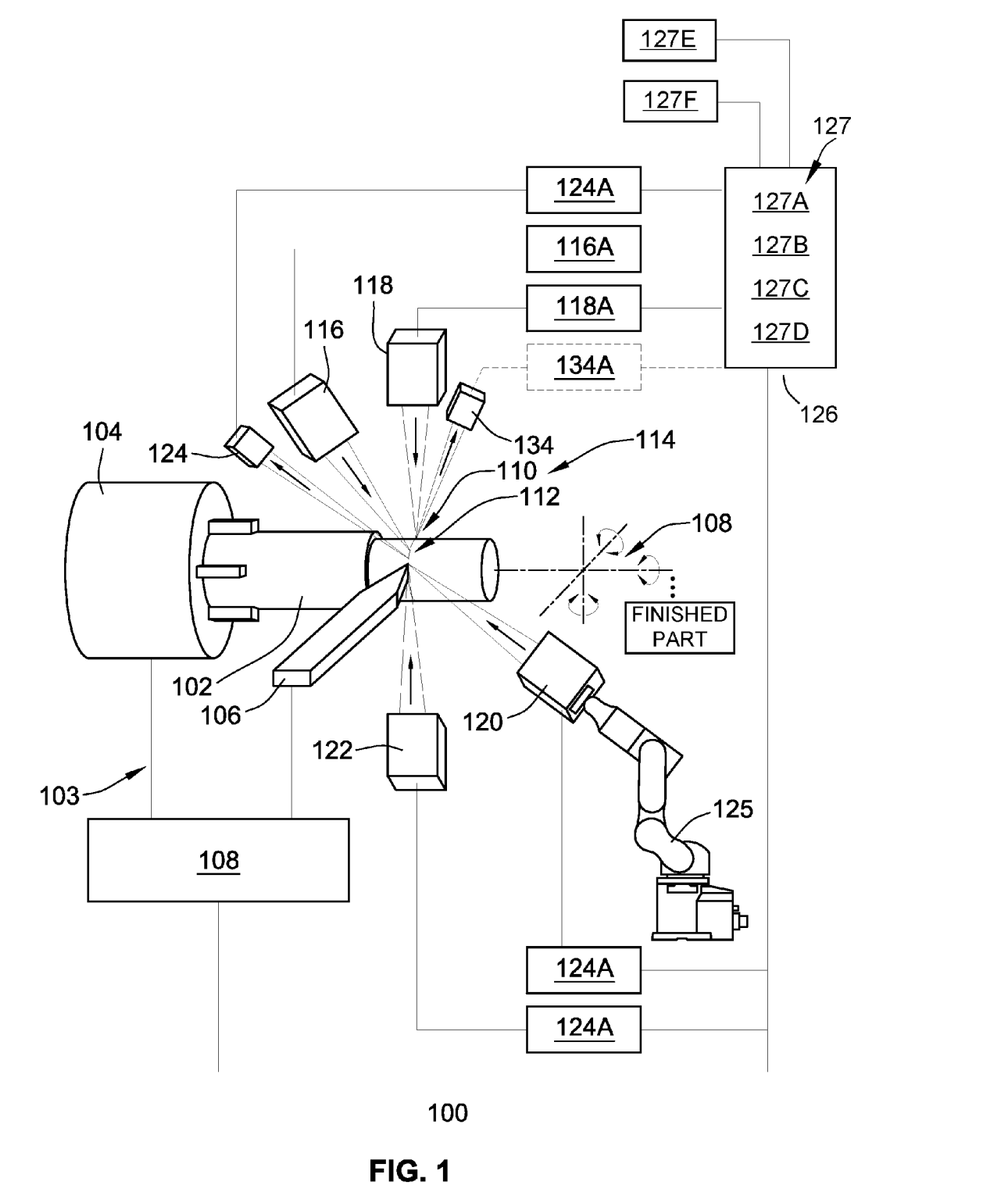
FIG. 1 is a schematic illustration of a first exemplary embodiment of an apparatus for laser assisted machining (LAM), according to the invention.

FIG. 1 shows a first exemplary embodiment of an apparatus 100 for laser assisted machining (LAM) of a finished part from a workpiece 102 mounted in a machining arrangement 103. The machining arrangement 103 is represented in FIG. 1 by a chuck 104, a cutter 106 and a machine controller 108 of a computer controlled lathe or machining center of the type known generally in the art.

The machining arrangement 103 directs the cutter 106 along a cutting path, generally indicated by arrow 110 in FIG. 1, under direction of a machining plan developed in accordance with the invention in the manner described in more detail below.

The cutting path 110 includes a cutting zone, indicated generally by arrow 112 in FIG. 1. The cutting zone 112 of the workpiece 102 is preferably located adjacent to, and ahead of the cutter 106.

The cutting zone 112 is heated to a desired machining temperature by a laser heating arrangement (LHA) 114 having one or more lasers (first, second, third and fourth lasers 116, 118, 120, 122, and a pyrometer 124 arrangement in the embodiment shown in FIG. 1). Each of the lasers 116, 118, 120, 122, and the first exemplary embodiment of the LAM apparatus 100 includes a corresponding laser power supply 116A, 118A, 120A, 122A. The pyrometer arrangement 124 includes an associated signal processing and feedback unit 124A.

As further indicated in FIG. 1, the third laser 120 is mounted on a robotic arrangement 125 that is operatively connected to, but moveable independently from the machining arrangement 103 and the workpiece 102. In other embodiments of the invention, more than one of the lasers, and/or one or more pyrometer arrangements may be mounted on such robotic arrangements.

As further shown in FIG. 1, the first exemplary embodiment of the LAM apparatus 100 includes a controller 126 that operatively connected to the laser heating arrangement 114 and the machining arrangement 103. Specifically, the controller 126 in the exemplary embodiment of the LAM apparatus 100 is connected to: The machine controller 108, the lasers 116, 118, 120, 122, via their respective laser power supplies 116A, 118A, 120A, 122A; the robotic arrangement 125; and, the pyrometer arrangement 124 through its signal processing and feedback unit 124A.

Although the controller 126 and the machine controller 108 are illustrated as separate elements in the exemplary embodiment of the LAM apparatus 100 in FIG. 1, those having skill in the art will recognize that in other embodiments of the invention the controller 126 and the machine controller 108 may be combined into a single element, or alternatively split into any appropriate number of elements. The particular arrangement shown in FIG. 1 was selected for illustrative purposes to show an embodiment in which the LAM apparatus 100 could be conveniently added to an existing machining arrangement 103 which already included a dedicated machine controller 108.

The controller 126 includes dynamic computer models 127 in machine readable format for the workpiece 102, with such dynamic computer models of the workpiece represented by reference character 127A, the finished part formed from the workpiece 102, with such dynamic computer models of the finished part formed from the workpiece represented by reference character 127B, the machining arrangement 103, with such dynamic computer models of the machining arrangement represented by reference character 127C, and the laser heating arrangement 114, with such dynamic computer models of the laser heating arrangement being represented by reference character 127D. These dynamic computer models are all related to a common reference system indicated by a series of intersecting linear and rotational axis as indicated at 108 in FIG. 1. The dynamic computer models described the physical shape and all potential movement and orientation of the models with respect to the common reference system 108.

The controller 126 also contains material property data in machine readable format for the workpiece and the machining arrangement, including thermal and optical material properties of the workpiece and desired machining temperature data. The machining temperature data may also include feed and speed data for operation of the cutter 106.

The controller 126 further contains laser and pyrometer operating parameters for the laser heating arrangement 114, in machine readable format. The laser operating parameters include input and output power, line-of-sight coordinates and beam configuration parameters for each of the lasers 116, 118, 120, 122. The pyrometer operating parameters include input and output operating parameters of the pyrometer arrangement 124.

The controller 126 is operable to generate a recommended machining plan 127E including the cutting path 110 and orientation of the models of the workpiece 102, the finished part and the machining arrangement 103 during machining of the finished part from the workpiece 102.

In the specific exemplary embodiment LAM apparatus 100 shown in FIG. 1, the machining arrangement 103 is essentially a lathe turning apparatus. This configuration was selected for ease of illustration and explanation, because the common reference system 108 for a lathe-type machining arrangement is relatively simply illustrated and understood. Those having skill in the art will recognize, however, that the invention is applicable to other types of machining arrangements, such as milling machines or computerized-numerical-controlled machines having the freedom to move both a cutter and the workpiece in a number of independent axis during the machining process.

The controller 126 is also operable to generate a recommended heating plan 127F for the laser heating arrangement 114 from the machining plan. The recommended heating plan operates the lasers 116, 118, 120, 122 in an appropriate manner to heat the cutting zone 112 with one or more of the lasers 116, 118, 120, 122 while monitoring the temperature of the cutting zone 112 with the pyrometer arrangement 124. The recommended heating plan includes movement and orientation of the model of the laser heating arrangement 114 during machining of the finished part from the workpiece 102.

The controller 126 is further operable to verify that the one or more lasers 116, 118, 120, 122 and the pyrometer 124 utilized in the recommended heating plan have an unobstructed line-of-sight from their location to the cutting zone 112 throughout the machining operation.

If the computer determines during the verification process that the cutting zone of the workpiece is not being maintained at the desired machining temperature, or that the lasers and pyrometers utilized in the recommended heating plan do not have an unobstructed line-of-sight from their location to the region 112 throughout the machining operation, the controller 126 is configured to iterate the generation and verification of the recommended machining and heating plan until the recommended machining and heating plans result in the cutting zone being maintained at the desired temperature with no obstruction of the line-of-sight throughout the machining process.

The controller is operatively connected to the machining arrangement 103 and the laser heating arrangement 114 for machining the workpiece 102 in accordance with the recommended machining and heating plans after the controller 126 successfully verifies that the recommended machining and heating plans result in the cutting zone 112 being maintained at the desired temperature and the line-of-sight not being obstructed throughout the machining process.

The controller 126 is further operable to verify that the cutting zone 112 of the workpiece 102 is maintained at the desired machining temperature during the machining operation on the basis of information received from the pyrometer arrangement 124.

In some embodiments of the invention, it is contemplated that the heating plan may require a hand-off from one of the lasers 116, 118, 120, 122 to another of the lasers during the machining operation in order to prevent having the line-of-sight be obstructed during the machining process. In similar fashion, it is contemplated that, in some embodiments of the invention using multiple pyrometer arrangements for monitoring the temperature of the cutting zone, the heating plan may require a hand-off of primary control from one of the multiple pyrometers to another of the pyrometers during the machining operation in order to prevent having the line-of-sight of the controlling pyrometer be obstructed during the machining process.

FIG. 1 also illustrates an alternate version of the first exemplary embodiment 100 in which the laser heating arrangement 114 further includes a second pyrometer 134 (shown in dashed lines) and second pyrometer processing unit 134A (shown in dashed lines) associated with the second laser 118. In the alternate version of the first exemplary embodiment of the LAM apparatus 100, the first pyrometer 124 may be selected for use as a master pyrometer 124, for control purposes in monitoring and maintaining the desired temperature in the cutting zone 112. The second pyrometer 134 may be configured to function as a slave pyrometer 134 assigned to monitor the contribution to temperature in the cutting zone being imparted by the second laser 118, for example, to thereby provide more precise monitoring and control of laser 118.

It is contemplated that such a second pyrometer 134 might be used in a variety of useful operational modes. For example, the second pyrometer 134 may be used to provide feedback indicating a loss of output of the second laser as it ages 118, or other valuable information such as an indication that a lens of the second laser 118 may be dirty or occluded. An apparatus and/or method according to the invention may be configured such that the controller can make compensating adjustments to operation of the second laser 118, based on input from the second pyrometer 134.

In embodiments of the invention having two or more pyrometers 124, 134, it is also contemplated that the designation of which pyrometer 124, 134 is the master pyrometer may change during machining operations for a variety of reasons including: the master pyrometer becoming inoperative; the view of the master pyrometer becoming blocked or partly obstructed; or, during machining operations where it is more advantageous to switch control designation between the pyrometers rather than moving a single pyrometer to another location in order to preserve an unobstructed view of the cutting zone 112.

Figure 2:
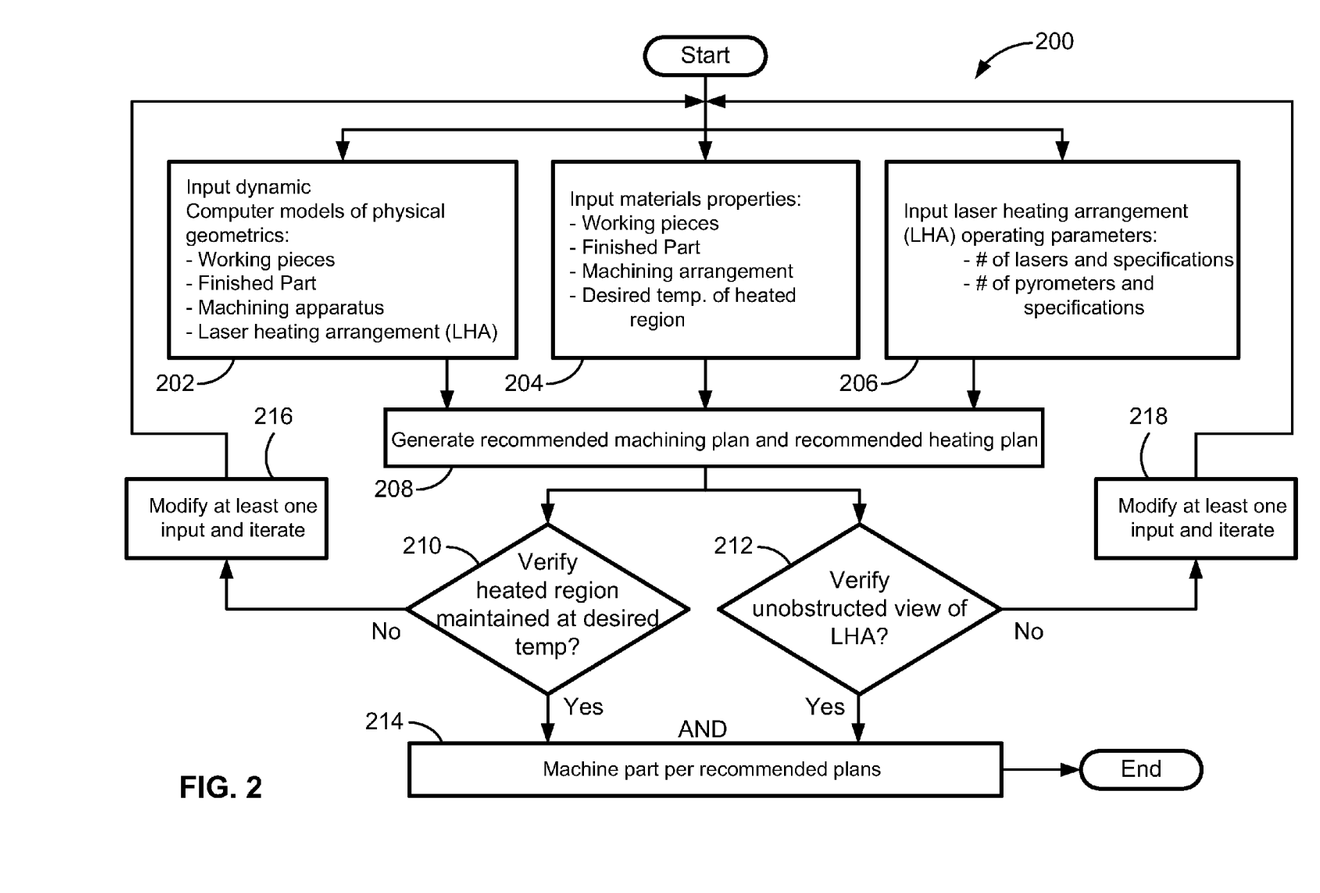
FIG. 2 is a block diagram illustrating a method for performing laser assisted machining, according to the invention.

FIG. 2 is a block diagram of an exemplary embodiment of a method 200 for laser assisted machining, in accordance with the invention, which may be used in practicing the invention. It will be understood by those having skill in the art that, the method 200 may be programmed into software or firmware, or a combination of software and firmware, stored inside of the controller 126.

For purposed of explanation and to facilitate understanding of various aspects of the invention, the description of the method 200 will utilizing the first exemplary embodiment of an apparatus 100 shown in FIG. 1 and discussed above. For consistency of explanation, the description of the method 200 will also endeavor to utilize the reference numerals for elements in the apparatus 100 as shown in FIG. 1, wherever possible.

To initiate the method 200, applicable dynamic computer models of the physical geometries of the workpiece 102, the finished part made from the workpiece 102, the machining apparatus 103 and the laser heating arrangement 114 are fed into the controller 126, along with material properties for the workpiece 102 and machining arrangement 103, and operating parameters for the lasers 116, 118, 120, 122 and the pyrometer arrangement 124, as shown in blocks 202, 204 and 206 of FIG. 2. Details of the specific types of inputs contemplated within the scope of the invention are described in more detail below.

The inputs supplied at blocks 202, 204 and 206 of FIG. 2 are then utilized by the controller 126 for generating a recommended machining plan, and also for generating a recommended heating plan, as shown at block 208 of FIG. 2.

In some embodiments of the invention, the material property inputs provided at block 204 of the method include a selection of a desired temperature of the cutting zone 112. In other embodiments of the invention, a method and/or apparatus according to the invention may include configuring the controller 126 to compute a recommended temperature of the cutting zone 112 based on other inputs such as material properties of the workpiece 102 and the configuration and material properties of the cutter 106, for example, of the machining arrangement 103.

As shown at decision diamonds 210 and 212 in FIG. 2, the controller 126 evaluates the recommended machining and heating plans to verify that two conditions exist throughout the machining process. Specifically, the controller 126 verifies that the cutting zone 112 is maintained at the desired temperature as shown in decision diamond 210, and also verifies that the components of the laser heating arrangement 114 have an unobstructed view of the cutting zone 112 during portions of the machining process where each respective component of the laser heating arrangement 114 is being utilized. In some embodiments of the invention, the geometry of the workpiece 102 and/or finished part, or the geometries and/or movement of the workpiece 102, the finished part, the components of the machining arrangement 103 and/or the components of the laser heating arrangement 114 may require a hand-off from one of the components of the laser heating arrangement 114 to another in order to maintain the cutting zone 112 at the desired temperature.

If the controller verifies that the recommended machining and heating plans generated in block 208 result in the cutting zone 112 being maintained at the desired temp, and that the active components of the laser heating element have an unobstructed view of the cutting zone 112, the controller 126 will proceed with directing the machining arrangement 103 and the laser heating arrangement 114 to form the finished part from the workpiece 102, in accordance with the recommended machining and heating plans, as indicated at block 214 of FIG. 2.

As indicated at blocks 216 and 218 in FIG. 2, if the controller determines that the recommended machining and heating plans generated at block 208 do not result in the cutting zone 112 being maintained at the desired temperature, or that the active components of the laser heating arrangement 114 do not have an unobstructed view of the cutting zone 112 during the entire machining process, at least one of the inputs provided in blocks 202, 204 and 206 will be modified and the method 200 will be iterated until recommended machining and heating plans are generated which do result in the cutting zone 112 being maintained at the desired temperature with an unobstructed view of the active components of the laser heating arrangement 114 during the entire machining process. At that point, the computer will move to block 214 and direct the machining arrangement 103 and laser heating arrangement 114 in forming the finished part from the workpiece 102.

The dynamic computer model provided to the controller 126 at block 202 of the method 200 are in machine readable format and include physical descriptions of the shape and movement potential of all applicable elements of an apparatus and/or method according to the invention. It is contemplated that these dynamic computer models would typically include models for the workpiece 102, the finished part, the machining arrangement 103 and the laser heating arrangement 114. It is further contemplated that all of the dynamic computer models would typically be related to a common reference system and describe all potential movement and orientation of the models with respect to the common reference system. In some embodiments of the invention, multiple reference systems may be utilized, with an apparatus and/or method according to the invention including provisions for geometrically linking all of the multiple reference systems.

It is contemplated that the material property data provided at block 204 of the method 200 will typically include data in machine readable format describing applicable material properties for the workpiece 102 and machining arrangement 103, including mechanical properties at elevated temperatures, thermal and optical material properties of the workpiece 102 and desired machining temperature data. Such material property data may also include cutter feed rate, cutter rotational speed for rotating cutters, and depth of cut data for the machining processes to be undertaken, and a tabulation, database or extrapolation model (either analytically or empirically derived) for machining temperature data to be used by the controller 126 in performance of the method according to the invention.

It is also contemplated that the operating parameters for the laser heating arrangement 114 provided at block 206 as an input in the method 200 will typically include information in machine readable format defining the input and output power, line-of-sight coordinates and beam configuration parameters for each of the lasers 116, 118, 120, 122, and would also include pyrometer operating parameters such as the input and output operational parameters of the pyrometer arrangement 124.

The recommended machining plan generated by the controller 126 in block 208 of the method 200 includes definition of the cutting path 110 for the cutter 106, and also definition of the movement and orientation of the models of the workpiece 102, the finished part and the machining arrangement 103 during machining of the finished part from the workpiece 102.

The recommended heating plan generated at block 208 of the method 200 includes all necessary instructions to direct the laser heating arrangement 114 to heat the cutting zone 112 with one or more of the lasers 116, 118, 120, 122 and monitor the temperature of the cutting zone with the pyrometer arrangement 124. The recommended heating plan includes definition of the movement and orientation of the model of the laser heating arrangement 114 during machining of the finished part from the workpiece 102.

In some forms of the invention, the modification and iteration of at least one of the inputs 202, 204 and 206, for blocks 216 and 218 of the method 200 includes iterating at least one of the recommended machining and heating plans to achieve at least one desired aspect of the method from a group of desired aspects consisting of: number of lasers 116, 118, 120, 122 used for heating; number of pyrometers 124, etc., used for measurement of the temperature of the cutting zone 112; the degrees of freedom of movement and orientation afforded the machining arrangement 103; the degrees of freedom of movement and orientation afforded one or more of the lasers 116, 118, 120, 122; the degrees of freedom of movement and orientation of the pyrometer arrangement 124; a desired surface finish of the finished parts; a desired tolerance range for a dimension of the finished part; a desired temperature range of the cutting zone 112; a desired shape of the cutting zone 112; a desired depth of heating for the cutting zone; a desired power input to the heating arrangement 114; a desired power output of the heating arrangement 114; cutting feeds and speed, and cutter shape; and cutter movement.

In some forms of a method, according to the invention, at least one of the heating and machining plans includes an adjustment to at least one of the heating and machining plans during the machining process. In some forms of the invention, the controller 126 may make such an adjustment to at least one of the machining and heating plans during the machining process "on-the-fly" as the machining process continues uninterrupted. In other embodiments of the invention, at least one of the recommended heating and machining plans may include stopping the machining process at least once so that the controller 126 can make an adjustment to at least one of the machining and heating plans while the heating process is stopped, and then resuming the machining process according to the recommended plans.

In various forms of the invention, adjustments made to at least one of the recommended machining and heating plans may include one or more adjustments from the group of adjustments consisting of: changing the cutter; changing the number or positioning of the lasers; and, repositioning the workpiece.

As will be readily understood by those having skill in the art, some embodiments of the invention may take the form of a controller-readable medium having controller executable instructions for performing the steps of a method for laser assisted machining of a finished part from a workpiece utilizing an apparatus and/or method according to the invention. Such controller executable instructions may be in accordance with either the first or second exemplary embodiments 100, 200 expressly described herein, or in accordance with any apparatus and/or method within the scope of the invention.

Figure 3:
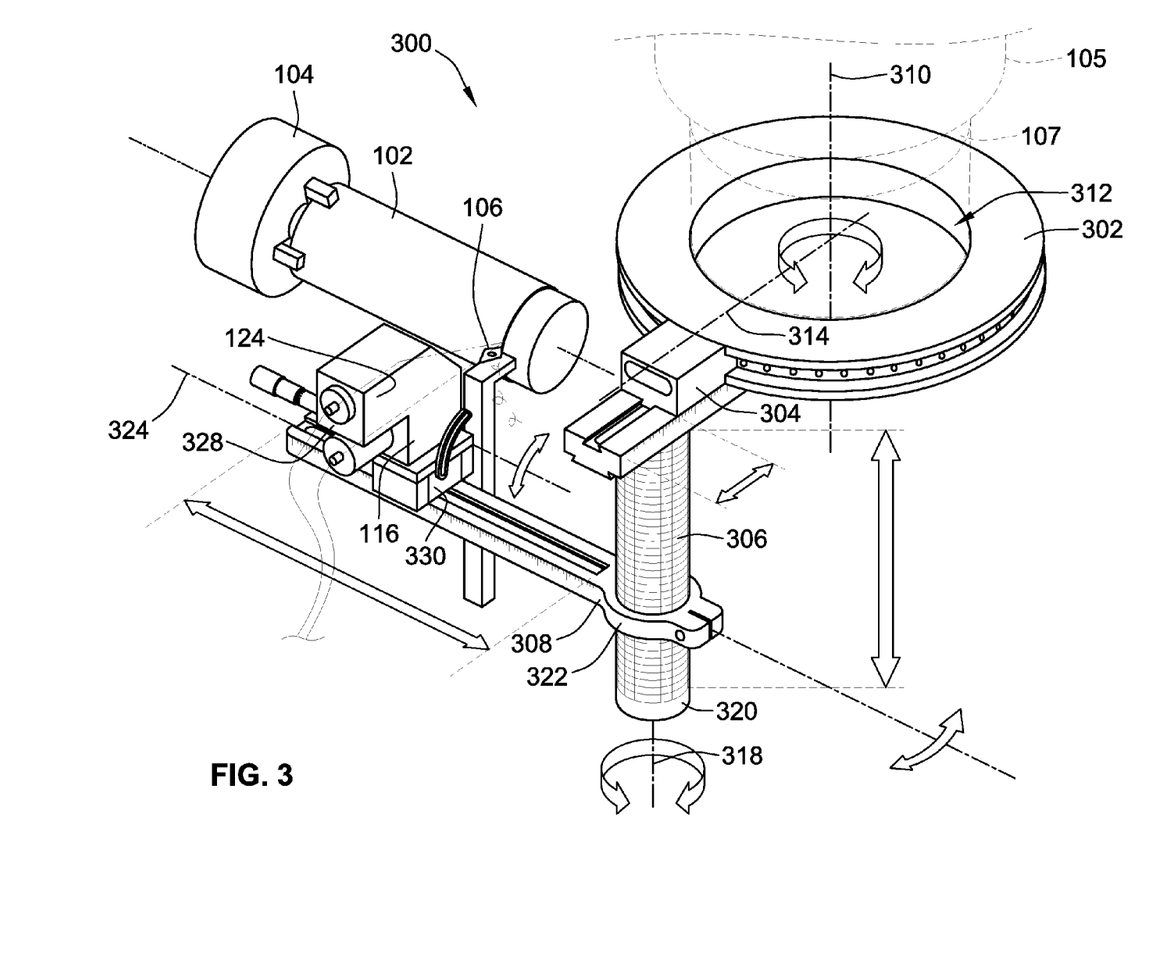
FIGS. 3 and 4 are assembled and exploded perspective views respectively of a second exemplary embodiment of an apparatus for laser assisted machining, according to the invention.
Figure 4:
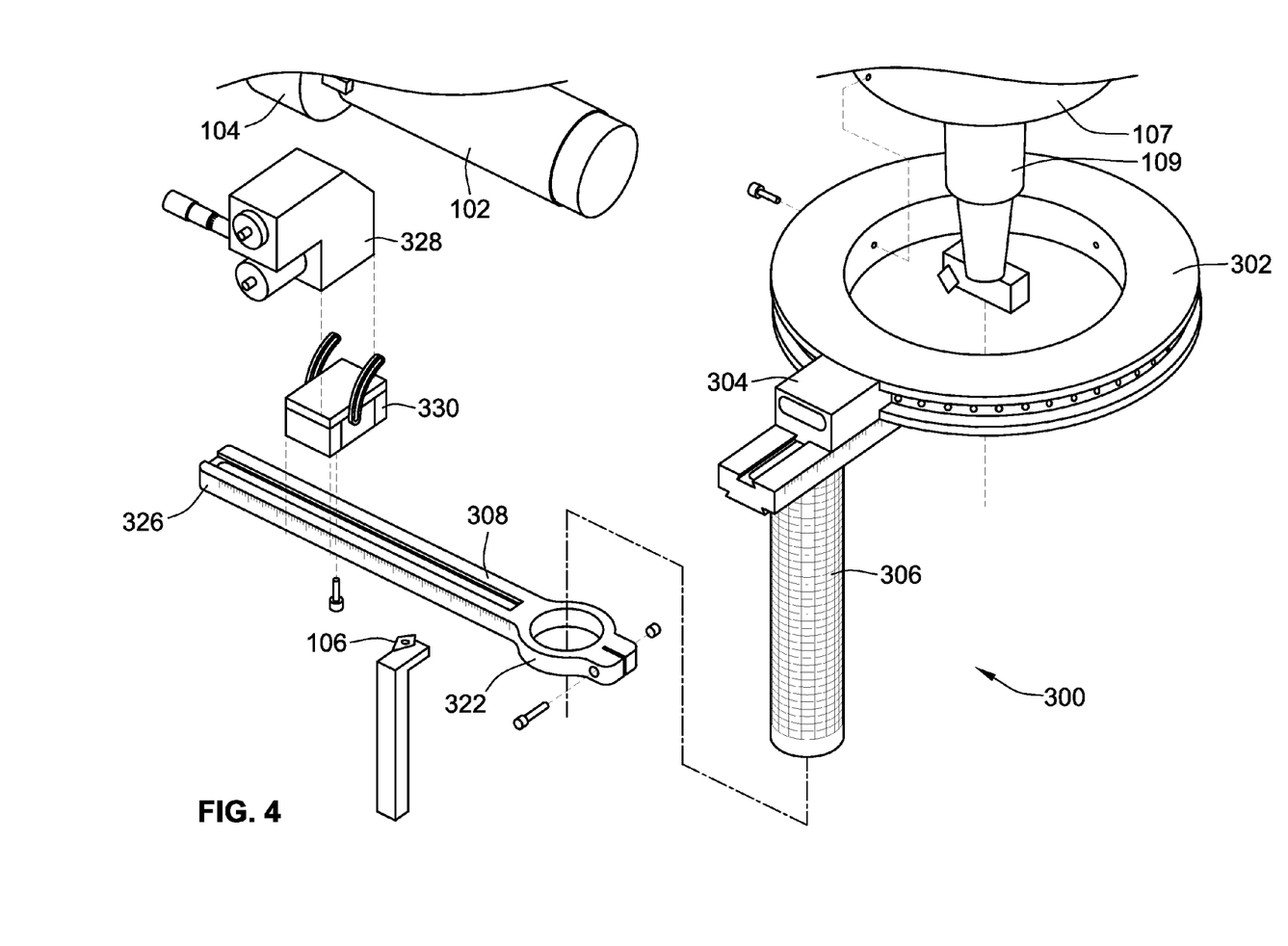

FIGS. 3 and 4 are perspective assembled and exploded views, respectively, of an exemplary embodiment of a laser assisted machining apparatus 300, according to the invention.

As shown in FIGS. 3 and 4, the apparatus 300 includes a base 302, a radial arm 304, a mounting post 306 and a primary mounting rail 308.

The base 302 is adapted for attachment to a turret 105 of the machining arrangement 103, and defines a central axis 310 extending perpendicularly to the base 302. In the embodiment shown in FIGS. 3 and 4, the turret 105 of the machining arrangement 103 is of the type generally known in the art and found on a MAZAK machining center, having a moveable central chuck 109 (see FIG. 4) and an outer element 107 disposed about and operatively connected to the central chuck 109 to allow movement of the central chuck 109 with respect to the outer element 107. The base 302 of the apparatus 300 is adapted for fixed attachment to the outer element 107 of the turret 105.

The exemplary embodiment of the turret 105 is generally circular shaped. Accordingly, the base 302 includes a generally circular opening therein, centered about the central axis 310 of the base 302. The base 302 is further configured for operative attachment to the outer element 107 of the turret 105 in such a manner that the central axis 310 of the base 302 is aligned substantially coaxial with the central chuck 109 of the turret 105. It will be recognized, by those having skill in the art, that an apparatus according to the invention having other elements and attributes of the exemplary embodiment of the apparatus 300 may have a different configuration and attachment means appropriate to a particular machining arrangement used in practicing the invention.

As shown in FIGS. 3 and 4, the radial arm 304 of the apparatus 300 extends radially outward from the base 302, and defines a radial axis 314 extending perpendicularly to and intersecting the central axis 310 of the base 302.

The mounting post 306 has a proximal end 316 thereof attached to the radial arm 304, and extends generally parallel to the central axis of the base 302, along a mounting post axis 318 extending from the proximal end 316 to a distal end 320 of the mounting post 306 in a direction parallel to the central axis 310 of the base 302.

The primary mounting rail 308 has a proximal end 322 thereof attached to the mounting post 306 and extending generally perpendicularly to the mounting post axis 318. The primary mounting rail 308 defines a primary mounting rail axis 324 extending generally from the proximal end 322 to a distal end 326 of the primary mounting rail 308 in a direction perpendicular to the mounting post axis 318.

The primary mounting rail 308 is adapted for attachment thereto of one or more components of the laser heating arrangement 114, from a group of laser heating arrangement components consisting of: at least one laser and at least one pyrometer arrangement.

As shown in FIGS. 3 and 4, a combination laser/pyrometer arrangement 328 (including a laser 116 and a pyrometer 124 in a common housing), is attached to the primary mounting rail 308 by an angularly adjustable LHA component mount 330. The adapter 330 is configured to allow angular adjustment about the primary mounting rail axis 324 of the combination laser and pyrometer 328, without having the primary mounting rail 308 itself be configured for partial rotation about the primary mounting rail axis 324.

Figure 5:
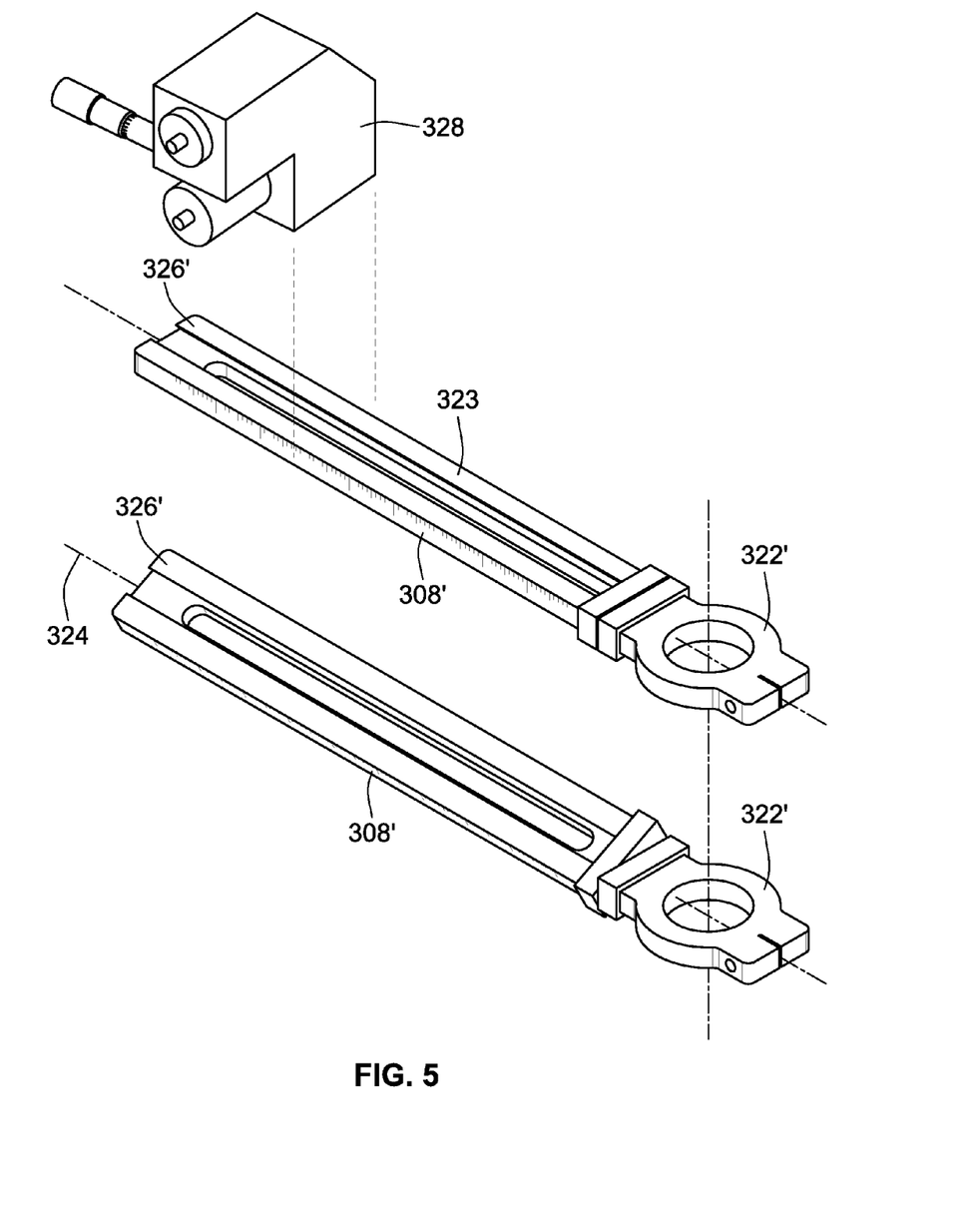
FIG. 5 is a perspective illustration of an alternate embodiment of a portion of the second exemplary embodiment of an apparatus for laser assisted machining shown in FIGS. 3 and 4.

In some embodiments of the invention, a laser and/or a pyrometer 328, 116, 124 may be attached directly to the primary mounting rail 308 without an intermediate adapter 330. For example, FIG. 5 illustrates an alternate embodiment of a primary mounting rail 308' having an intermediate section 323 of the primary mounting rail 308' disposed between the proximal and distal ends 322', 326' of the primary mounting rail 308', configured for relative rotation about the primary mounting rail axis 324. By virtue of this configuration, the necessity for having an angularly adjustable LHA component mount 330 is eliminated.

Figure 6:
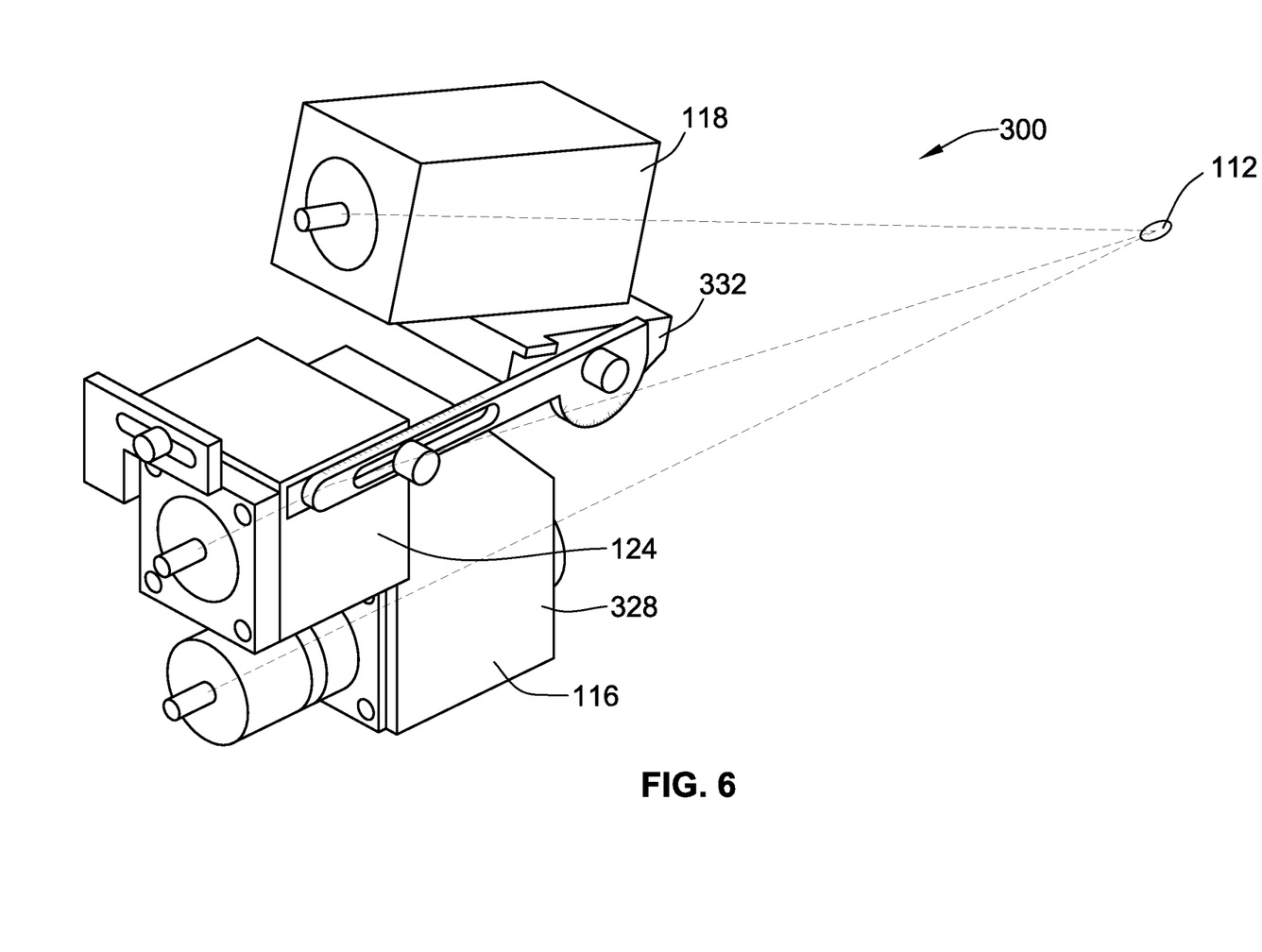
FIG. 6 is a perspective illustration showing an angularly adjustable mount for joining together two or more components of a laser heating arrangement of the second exemplary embodiment of an apparatus shown in FIGS. 3-5.

As shown in FIG. 6, the apparatus 300 may further include a second LHA component mount 332 for mounting a second LHA component (a second laser 118 in FIG. 6) onto an other LHA component, such as the combination laser/pyrometer 328. The second LHA component mount may also be configured, as illustrated in FIG. 6, to allow angular adjustment of the second LHA component with respect to the first LHA component 118, 328, in such a manner that the optical axes of the various LHA components 116, 118, 124 joined together into a common assembly may be aligned to converge at a common point, such as the cutting zone 112 of the workpiece.

As will be understood from the exemplary embodiment of the apparatus 300 illustrated in FIGS. 3-6, the base 302, radial arm 304, mounting post 306 and mounting rail 308 form components of the laser assisted machining apparatus 300 that are cooperatively configured and operatively connected such that they are moveable relative to one another in at least one of a group of relative movements consisting of:

the radial arm 304 is movable angularly with respect to the base 302 about the central axis 310 of the base;

the mounting post 306 is movable with respect to the radial arm 304 along the radial axis 314 of the radial arm 304;

the primary mounting rail 308 is movable with respect to the mounting post 306 along the mounting post axis 318;

the primary mounting rail 308 is movable angularly with respect to the mounting post 306 about the mounting post axis 318; and the intermediate section 323 of the alternate embodiment of the primary mounting rail 308' is rotatable about the primary mounting rail axis 324.

The apparatus 300 may also include marked indicia on one or more of the components, such as the base 302, the radial arm 304, the mounting post 306, the primary mounting rail 308, and any of the angularly adjustable LHA component mounts 330, 332 to facilitate positioning of the movable components of the apparatus 300.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for Laser Assisted Machining (LAM) of a finished part from a workpiece mounted in a machining arrangement using a cutter of the machining arrangement for removing material from the workpiece along a cutting path including a cutting zone of the workpiece ahead of the cutter where the cutting zone is heated to a machining temperature by a laser heating arrangement (LHA) operatively disposed for heating the cutting zone to a temperature of the cutting zone, the apparatus comprising:

a base adapted for attachment to the machining arrangement and defining a central axis extending perpendicularly to the base;

a radial arm extending radially outward from the base and defining a radial axis extending perpendicularly to and intersecting the central axis of the base;

a mounting post having a proximal end thereof directly attached to a slidable connection of the radial arm and extending parallel to the central axis of the base, and also defining a mounting post axis extending from the proximal end to a distal end of the mounting post in a direction parallel to the central axis of the base; and a primary mounting rail having a proximal end thereof attached to the mounting post and extending perpendicularly to the mounting post axis, and also defining a primary mounting rail axis extending from the proximal end to a distal end of the primary mounting rail in a direction perpendicular to the mounting post axis;

the primary mounting rail being adapted for attachment thereto of one or more components of the laser heating arrangement from a group of laser heating arrangement components consisting of: at least one laser and at least one pyrometer arrangement.

2. The apparatus for LAM of claim 1, wherein, the base, radial arm, mounting post and primary mounting rail comprise components of the apparatus for LAM that are cooperatively configured and operatively connected such that they are movable relative to one another in at least one of a group of relative movements consisting of:
the radial arm is movable angularly with respect to the base about the central axis of the base;
the mounting post is movable with respect to the radial arm along the radial axis of the radial arm;
the primary mounting rail is movable with respect to the mounting post along the mounting post axis;
the primary mounting rail is movable angularly with respect to the mounting post about the mounting post axis; and
the primary mounting rail is rotatable about the primary mounting rail axis.

3. The apparatus for LAM of claim 2, wherein, one or more of the base, radial arm, mounting post and primary mounting rail include marked indicia to facilitate positioning of movable components of the apparatus for LAM.

4. The apparatus for LAM of claim 2, wherein, the primary mounting rail includes marked indicia thereupon to facilitate positioning of the one or more components of the laser heating arrangement.

5. The apparatus for LAM of claim 1, further comprising, a laser heating arrangement (LHA) component mount adapted for operatively mounting the one or more components of the laser heating arrangement on the primary mounting rail.

6. The apparatus for LAM of claim 5, wherein, the primary mounting rail includes marked indicia thereupon to facilitate positioning of the LHA component mount along the primary mounting rail.

7. The apparatus for LAM of claim 5, wherein, the LHA component mount is configured to provide angular adjustment of an angular position of the LHA component with respect to the primary mounting rail.

8. The apparatus for LAM of claim 7, wherein, the LHA component mount includes angular indicia thereupon to facilitate angular adjustment of the angular position of the LHA component with respect to the primary mounting rail.

9. The apparatus for LAM of claim 1, further comprising, a first and a second LHA component, and a second LHA component mount for mounting the second LHA component on the first LHA component.

10. The apparatus for LAM of claim 9, further comprising, a second LHA component mount configured to provide angular adjustment of an angular position of the second LHA component with respect to the first LHA component.

11. The apparatus for LAM of claim 10, wherein, the second LHA component mount includes angular indicia thereupon to facilitate angular adjustment of the angular position of the second LHA component with respect to the first LHA component.

12. The apparatus for LAM of claim 10, further comprising, a first LHA component mount adapted for operatively mounting the first LHA component on the primary mounting rail, with the first LHA component mount being configured to provide angular adjustment of an angular position of the first LHA component with respect to the primary mounting rail.

13. The apparatus for LAM of claim 12, wherein, the first LHA component mount includes angular indicia thereupon to facilitate angular adjustment of the angular position of the first LHA component with respect to the primary mounting rail.

14. The apparatus for LAM of claim 1, wherein:
the machining arrangement includes a turret having a movable central chuck and an outer element disposed about and operatively connected to the central chuck to allow movement of the central chuck with respect to the outer element; and
the base of the apparatus for LAM is adapted for attachment to the outer element of the turret.

15. The apparatus for LAM of claim 14, wherein:
the outer element of the turret is circular shaped; and
the base includes a circular opening therein centered about the central axis of the base, with the base being further configured for operative attachment to the outer element of the turret in such a manner that the central axis of the base is aligned coaxial with the central chuck of the turret.

* * * * *

UNITED STATES PATENT AND TRADEMARK OFFICE
CERTIFICATE OF CORRECTION

PATENT NO. : 9,539,681 B2  
APPLICATION NO. : 13/307532  
DATED : January 10, 2017  
INVENTOR(S) : Joseph S. Santner et al.

Page 1 of 1

It is certified that error appears in the above-identified patent and that said Letters Patent is hereby corrected as shown below:

In the Specification

Please insert the following, immediately following the title of the invention:

--STATEMENT REGARDING FEDERALLY SPONSORED RESEARCH AND DEVELOPMENT
This invention was made with government support under Grant Number W56HZV-04-C-0783 awarded by the United States Army TACOM. The government has certain rights in this invention.--

Signed and Sealed this
Twenty-fourth Day of July, 2018

Andrei Iancu
*Director of the United States Patent and Trademark Office*